United States Patent [19]

Reid

[11] Patent Number: 5,027,104
[45] Date of Patent: Jun. 25, 1991

[54] VEHICLE SECURITY DEVICE

[76] Inventor: Donald J. Reid, 12 Vernon Pl., Smithtown, N.Y. 11787

[21] Appl. No.: 483,543

[22] Filed: Feb. 21, 1990

[51] Int. Cl.$^5$ .............................................. G08B 13/00
[52] U.S. Cl. .................................... 340/541; 340/426; 340/937; 358/108
[58] Field of Search ............... 340/945, 426, 429, 937, 340/541; 307/10.2; 358/108, 103

[56] References Cited

U.S. PATENT DOCUMENTS

| | | | |
|---|---|---|---|
| 3,482,037 | 12/1969 | Brown et al. | 358/108 |
| 4,347,590 | 8/1982 | Heger et al. | 340/691 |
| 4,420,238 | 12/1983 | Felix | 358/108 |
| 4,511,886 | 4/1985 | Rodriguez | 358/108 |
| 4,522,146 | 6/1985 | Carlson | 116/2 |
| 4,651,143 | 3/1987 | Yamanaka | 340/541 |
| 4,772,875 | 9/1988 | Maddox et al. | 340/522 |
| 4,789,904 | 12/1988 | Peterson | 358/108 |
| 4,831,438 | 8/1989 | Bellman, Jr. et al. | 358/108 |
| 4,857,912 | 8/1989 | Everett, Jr. et al. | 340/825.34 |

Primary Examiner—Joseph A. Orsino
Assistant Examiner—Brent A. Swarthout
Attorney, Agent, or Firm—H. Jay Spiegel

[57] ABSTRACT

A vehicle security device is disclosed which includes a multiplicity of video cameras mounted in a vehicle in hidden fashion, and designed to be activated responsive to sensing of a condition such as, for example, unauthorized entry of a vehicle, striking of the vehicle and the like. A controller controls activation of the cameras as well as activation of a local and remote alarm system. A recording mechanism may be provided to record that which is observed by the cameras and a further transmitter may be employed to transmit video pictures to a remote location.

6 Claims, 2 Drawing Sheets

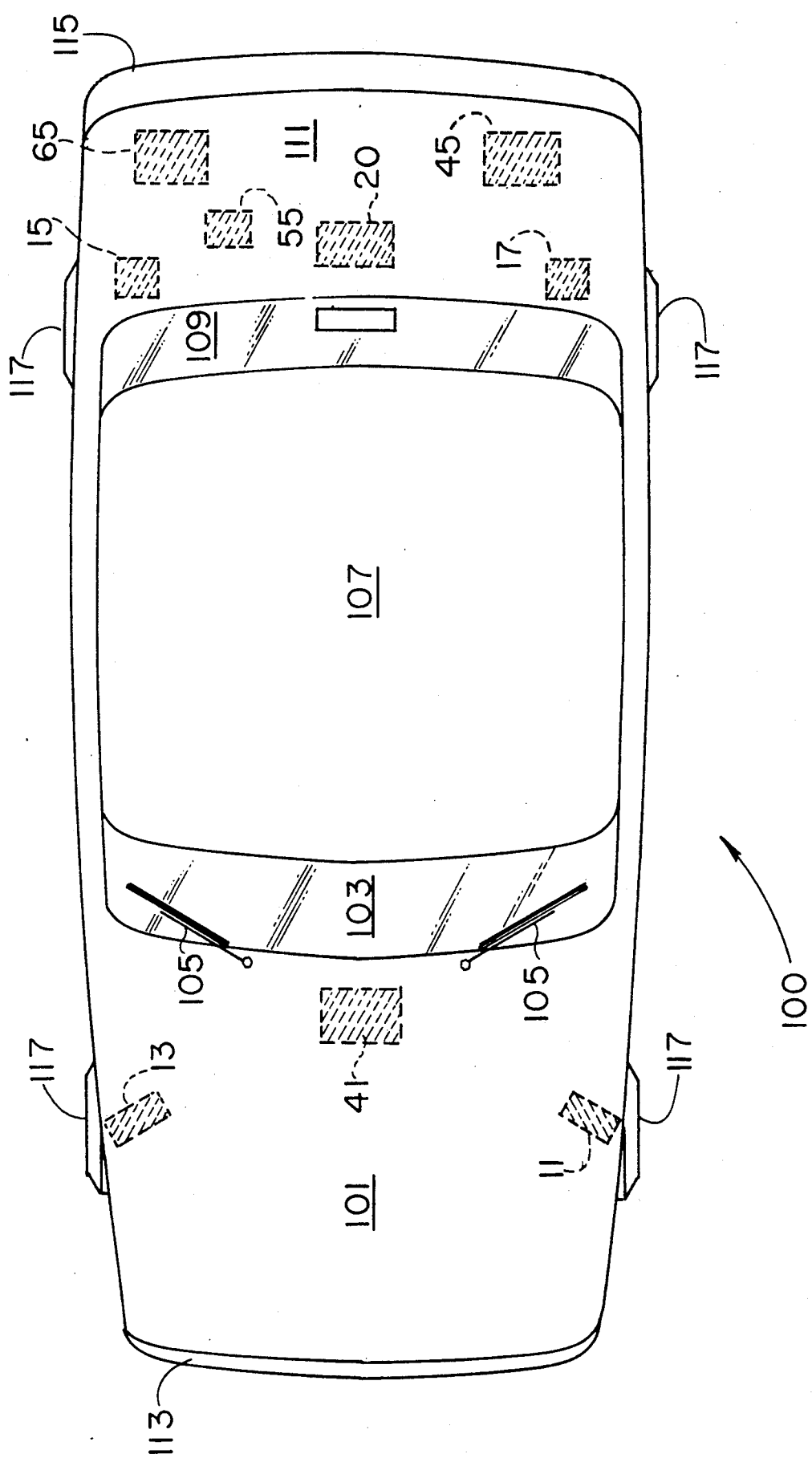

VEHICLE SECURITY DEVICE

BACKGROUND OF THE INVENTION

The present invention relates to a vehicle security device. In the prior art, security systems for vehicles are known; however, Applicant is unaware of any such system which includes all of the features and aspects of the present invention.

The following prior art is known to Applicant:

U.S. Pat. No. 4,651,144 to Pagano teaches the concept of a device designed to resemble a surveillance camera and having illumination means which are activated or deactivated responsive to sensing of an intrusion. The present invention differs from the teachings of Pagano as including a plurality of actual cameras along with the associated electrical circuitry therefor.

U.S. Pat. No. 4,772,375 to Maddox et al. discloses an intrusion detecting device including sensors such as ultrasonic and microwave sensors designed to monitor an area. The present invention differs from the teachings of Maddox et al. as including a plurality of cameras hidden in a vehicle and control structure allowing the cameras to record a sensed intrusion.

U.S. Pat. No. 4,843,463 to Michetti discloses a land vehicle mounted audio-visual trip recorder designed to operate when a vehicle is moving to monitor various aspects of the operation thereof. The present invention differs from the teachings of Michetti as being intended to operate when a vehicle is at a standstill for the purpose of monitoring any intrusions or disturbances.

SUMMARY OF THE INVENTION

The present invention relates to a vehicle security device. The present invention includes the following interrelated aspects and features:

(a) In a first aspect, the present invention is intended to include a plurality of cameras, preferably four in number, which are hidden in various locations in a vehicle. The cameras may be hidden in locations allowing monitoring of the passenger compartment of the vehicle, as well as storage areas thereof and the surrounding exterior thereof.

(b) In a further aspect, a sensor is provided which is designed to sense various conditions and, responsive thereto, to activate one or more of the cameras. The sensor may sense motion, light, sound, vibration or other condition.

(c) A controller is provided which may comprise a microprocessor which controls all aspects of the inventive system. The controller receives signals from the sensor indicative of a sensed condition and responsive thereto may activate one or more of the cameras. The controller may receive signals from one or more of the cameras, including program signals indicative of that which has been viewed by the camera(s). Responsive to sensing of such signals, the controller may activate a local alarm hidden somewhere in the vehicle to scare off an intruder.

(d) In a further aspect, a first transmitter may be provided which may transmit a signal at a first transmission frequency by wireless transmission to a first remote receiver which includes an alarm circuit activated by signals received from the transmitter so as to notify the owner of the vehicle that an intrusion has been detected.

(e) The inventive system may include a second transmitter designed to transmit video signals at a second transmission frequency to a second remote receiver designed to receive these signals so that one may observe the intrusion from a remote location.

(f) A recording mechanism may be provided in the vehicle or at the second remote receiver so as to facilitate recording of video signals indicative of that which is observed by the cameras.

(g) If desired, the cameras may be equipped with microphones so that audio signals may be received and processed.

Accordingly, it is a first object of the present invention to provide a vehicle security device.

It is a further object of the present invention to provide such a device including a plurality of cameras and a controller allowing transmission of an alarm to a remote location.

It is a yet further object of the present invention to provide such a system including a further transmitter for transmitting video signals received from the camera to a remote location.

It is a still further object of the present invention to provide such a device wherein a sensor may sense intrusion signals and responsive thereto maY activate one or more of the cameras.

These and other objects, aspects and features of the present invention will be better understood from the following detailed description of the preferred embodiment when read in conjunction with the appended drawing figures.

BRIEF DESCRIPTION OF THE DRAWINGS

FIG. 2 shows a further schematic representation of an example of the inventive system as mounted in a vehicle.

SPECIFIC DESCRIPTION OF THE PREFERRED EMBODIMENT

Figure 1:
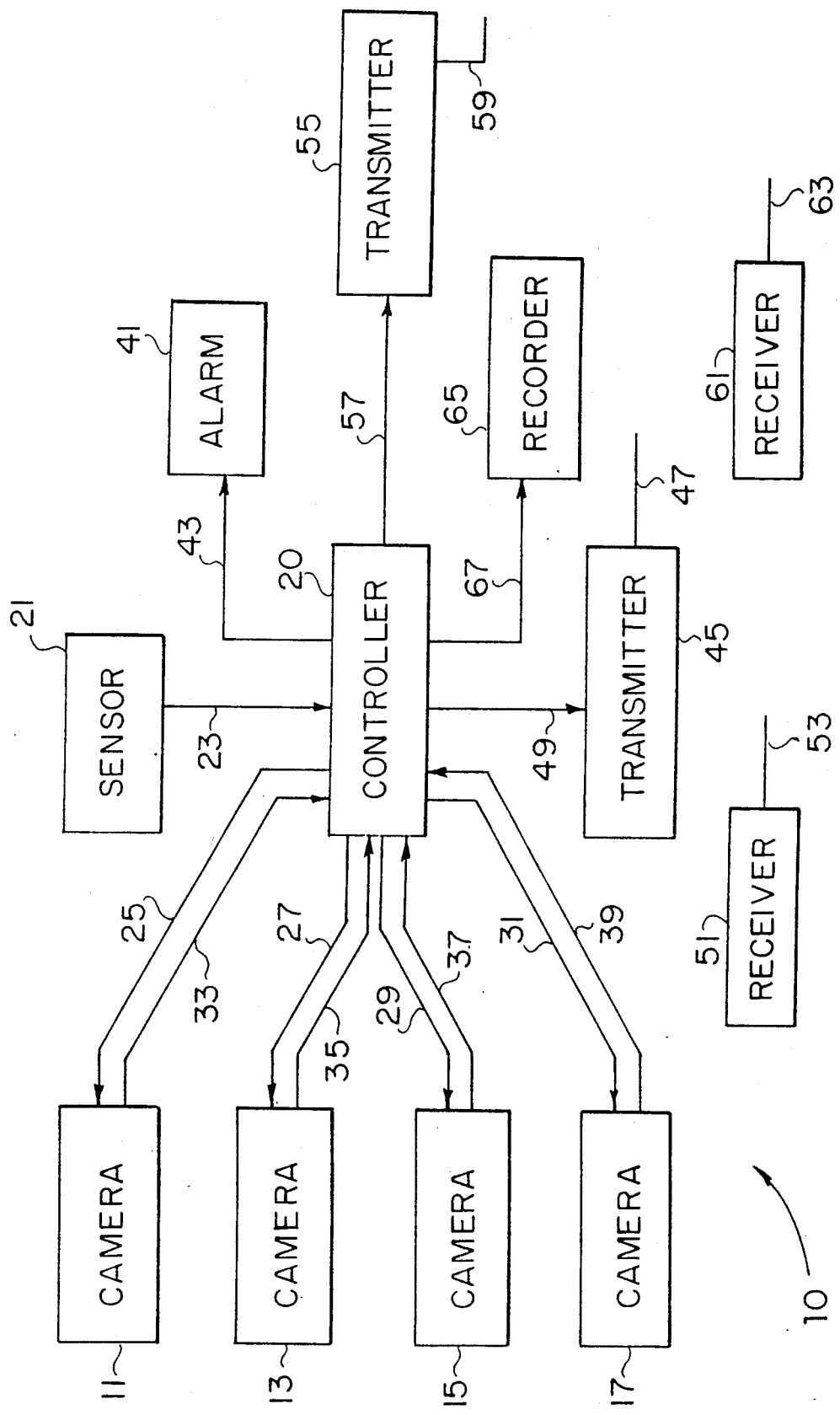
FIG. 1 shows a schematic representation of the inventive system.

With reference, first, to FIG. 1, the inventive system is generally designated by the reference numeral 10 and is seen to include a multiplicity of cameras designated by the reference numerals 11, 13, 15, and 17.

A controller 20 is provided which receives intrusion signals from a sensor 21 via an electrical conductor 23. If desired, the sensor 21 may transmit signals to the controller 20 by a wireless link.

Responsive to sensing of signals from the sensor 21 which may be indicative of intrusion into the vehicle, striking of the vehicle from outside, approach to too close a proximity to the vehicle, or other intrusion, the controller 20 is operative to activate one or more of the cameras 11, 13, 15, and 17 via the respective control conductors 25, 27, 29 and 31. In this regard, it should be understood that the sensor 21 may comprise a multiplicity of sensors mounted in different locations on the vehicle with each sensor being coupled to one or more of the cameras so that when a particular sensor senses an intrusion condition, only some or one of the cameras is/are activated. If the vehicle is struck, such as would be the case in an accident where the parked vehicle is struck by another vehicle, for example, all cameras would be activated.

The cameras 11, 13, 15 and 17 transmit signals to the controller 20 via the respective conductors 33, 35, 37 and 39. These signals are received by the controller, which processes the signals in a manner well known to those skilled in the art, and responsive to receiving of such signals may activate a local alarm 41 via the conductor 43. The local alarm 41 may comprise flashing lights, a horn, a bell, or other audible or visual signalling means, or both, which alarm is designed to surprise an intruder and to cause the intruder to leave the premises.

Concurrently with activating of the alarm 41, a transmitter 45 having an antenna 47 may be activated via the conductor 49 to transmit signals at a frequency compatible with the receiver 51 which has antenna 53 designed to receive such signals. In the preferred embodiment of the present invention, the receiver 51 includes an internal alarm circuit activated by signals received at the antenna 53, which alarm circuit may include audio alarm means, video alarm means, or both. The receiver 51 is designed to be sized small enough to be carried within a pocket of the owner of the associated vehicle.

Concurrently with activation of the transmitter 45, a second transmitter 55 may be activated by the conductor 57 to transmit signals by the antenna 59 to a second remote receiver 61 having an antenna 63 for this purpose In the preferred embodiment of the present invention, the receiver 61 .s designed to receive video signals, audio signals, or both, so that signals transmitted to the controller 20 from the cameras 11, 13, 15 and 17 may be viewed from a remote location.

In the preferred embodiment, the inventive system 10 includes a recorder 65 connected to the controller 20 via the conductor 67. The recorder 65 may be activated via signals received therefrom from the controller 20 whenever one or more cameras are activated so that audio and/or video signals from the cameras may be stored for later viewing. For this purpose, the recorder will include a number of recording devices corresponding in number to the number of cameras so that signals from each of the cameras may be separately recorded.

If desired, each camera may include a microphone allowing recording of audio signals.

FIG. 2 shows a schematic representation of one example of a manner of mounting of the inventive system 10 in a vehicle 100. The vehicle 100 is seen to include a hood 101, a windshield 103 having windshield wipers 105 associated therewith, a roof 107, a rear window 109, and a trunk lid 111 hiding a trunk within. A front bumper 113 and a rear bumper 115 are provided, as well as tires 117. Cameras 11, 13, 15, and 17 are mounted as shown with the cameras 11 and 13 being hidden within the engine compartment of the vehicle and with the cameras 15 and 17 being hidden within the trunk area of the vehicle. The cameras 11 and 13 are located to view the area around the vehicle, whereas the cameras 15 and 17 are mounted to view the interior of the passenger compartment thereof. Of course, these locations of mounting of the cameras are merely exemplary.

As shown in FIG. 2 in phantom, the controller 20, first transmitter 45, second transmitter 55, and recorder 65 are stored within the trunk. The alarm 41 is contained within the engine compartment of the vehicle, while the sensor 21 (not shown in FIG. 2) may be located in any desired location and may consist of various diverse sensors mounted in different locations on the vehicle.

As such, an invention has been disclosed in terms of a preferred embodiment thereof which fulfills each and every one of the objects of the invention as set forth hereinabove and provides an improved vehicle security device of great novelty and utility. Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An improved security device, mounted in a vehicle having a passenger compartment and comprising:
   (a) a plurality of cameras, at least one of said cameras being mounted in said vehicle but outside said passenger compartment;
   (b) first sensor means of sensing an intrusion condition and second sensor means for sensing striking of the vehicle from outside;
   (c) controller means for receiving signals from said first sensor means indicative of an intrusion and, responsive thereto, activating one of said cameras and further wherein when said controller means receives signals from said second sensor means indicative of a striking of said vehicle, responsive thereto, said controller means activates all of said plurality of cameras;
   (d) said controller means receiving program signals from said cameras;
   (e) first transmitter means for transmitting wireless alarm signals to a remote first receiver responsive to said controller means receiving said program signals;
   (f) second transmitter means for concurrently transmitting further wireless program signals to a remote second receiver, said wireless program signals corresponding to said program signals and;
   (g) recorder means for recording said program signals.

2. The invention of claim 1, wherein said intrusion condition comprises a sensed motion.

3. The invention of claim 1, wherein said at least one camera includes a microphone.

4. The invention of claim 1, wherein said first receiver includes means for signalling receipt of alarm signals comprising an alarm.

5. The invention of claim 4, wherein said alarm is an audio alarm.

6. The invention of claim 4, wherein said alarm is a visual alarm.

* * * * *